US011612251B2

(12) United States Patent
Rafieha (10) Patent No.: US 11,612,251 B2
(45) Date of Patent: Mar. 28, 2023

(54) CONTROL PANEL FOR FURNITURE AND HOME ENTERTAINMENT SYSTEM (71) Applicant: Abbyson Living LLC, Calabasas, CA (US)

(72) Inventor: Rodd Rafieha, Calabasas, CA (US)

(73) Assignee: Abbyson Living, LLC, Calabasas, CA (US)

( * ) Notice: Subject to any disclaimer, the term of this patent is extended or adjusted under 35 U.S.C. 154(b) by 0 days.

(21) Appl. No.: 17/164,070

(22) Filed: Feb. 1, 2021

(65) Prior Publication Data
US 2021/0235874 A1 Aug. 5, 2021

Related U.S. Application Data (60) Provisional application No. 62/968,834, filed on Jan. 31, 2020.

(51) Int. Cl.
A47C 7/72 (2006.01)
H02J 50/10 (2016.01)
(Continued)

(52) U.S. Cl.
CPC ............ A47C 7/723 (2018.08); A47C 7/506 (2013.01); A47C 7/543 (2013.01); A47C 7/727 (2018.08);
(Continued)

(58) Field of Classification Search
CPC ..... A47C 7/723; A47C 1/12; B64D 11/00153; B64D 11/00155; B60R 2011/0294; B60N 2/797; B60K 2370/1438
See application file for complete search history.

(56) References Cited

U.S. PATENT DOCUMENTS 2,696,870 A 12/1954 Mende
D224,994 S 10/1972 Sokolowski
(Continued)

FOREIGN PATENT DOCUMENTS

CN 110626286 A * 12/2019
CN 111134479 A * 5/2020
(Continued)

OTHER PUBLICATIONS

Patio Furniture Newport Outdoor, [online] Published on May 7, 2016. Retrieved Jul. 11, 2017 from URL: https://www.abbyson.com/index.php/ products/outdoor/patio-furniture/newport-outdoor-espresso-brown-wicker-6-piece-sectional-dl-rs038-6pc-detail.
(Continued)

Primary Examiner — Timothy J Brindley
(74) Attorney, Agent, or Firm — Stradling Yocca Carlson & Rauth (57) ABSTRACT Furniture entertainment hubs are disclosed that are integrated in a piece of furniture to conveniently control the piece of furniture, while at the same time providing a convenient means of communicating with and charging a remote smart device such as a smart phone or tablet. The entertainment hubs can be in many different locations in the piece of furniture, with some embodiments embedded in an armrest with the hub having a touch screen accessible at the top surface of the armrest. The entertainment hub provides a sleek, aesthetic and easy to mechanism for controlling the chair/sofa and interfacing with remote devices. One embodiment of an entertainment hub for a seating apparatus comprising a body with a plurality of planar surfaces, wherein one of said plurality of surfaces comprises a substantially flat control panel. The control panel comprises a plurality of visual touch buttons, a remote device wireless charging pad, and a speaker. Wherein said body is arranged to be mounted
(Continued)

in a piece of piece of furniture with most of the body embedded in said piece of furniture with said control panel being visible and accessible.

20 Claims, 11 Drawing Sheets

(51) Int. Cl.
    *A47C 7/50*     (2006.01)
    *A47C 7/54*     (2006.01)
    *B60N 2/75*     (2018.01)

(52) U.S. Cl.
    CPC .............. *B60N 2/797* (2018.02); *H02J 50/10* (2016.02); *B60K 2370/1438* (2019.05)

(56) References Cited

U.S. PATENT DOCUMENTS

| | | | |
|---|---|---|---|
| D228,161 S | 8/1973 | Andrus | |
| D247,594 S | 3/1978 | Corson | |
| D260,823 S | 9/1981 | Stulik | |
| D270,308 S | 8/1983 | Aronowitz et al. | |
| D271,924 S | 12/1983 | Nishimoto | |
| D284,428 S | 7/1986 | Raftery | |
| D297,080 S | 8/1988 | Hemberg | |
| D379,014 S | 4/1997 | Woods, II | |
| D450,944 S | 11/2001 | Shepard | |
| D554,078 S | 10/2007 | Laurent | |
| D561,496 S | 2/2008 | Kreiss | |
| D569,111 S | 5/2008 | Swanson | |
| D622,988 S | 9/2010 | Alford | |
| D624,928 S | 10/2010 | Agnetta | |
| D624,929 S | 10/2010 | Agnetta | |
| D650,605 S | 12/2011 | Haimoff | |
| D651,012 S | 12/2011 | Lenney | |
| D664,782 S | 8/2012 | Lenney | |
| D668,465 S | 10/2012 | Adir | |
| D738,928 S | 9/2015 | Mahaffey | |
| D739,413 S | 9/2015 | Shin | |
| D747,991 S | 1/2016 | Lee | |
| D812,624 S | 3/2018 | Kim | |
| D834,437 S | 11/2018 | Zhang | |
| D848,483 S | 5/2019 | Itano | |
| D881,237 S | 4/2020 | Arima | |
| D882,981 S | 5/2020 | Dix | |
| D884,741 S | 5/2020 | Arima | |
| D890,784 S | 7/2020 | Shelton, IV | |
| D896,266 S | 9/2020 | Kennedy | |
| D898,770 S | 10/2020 | Kessler | |
| D905,091 S | 12/2020 | Henry | |
| 2004/0004376 A1 | 1/2004 | Cabebe | |
| 2009/0152915 A1* | 6/2009 | Krasna ................. | A47C 1/0342 297/217.3 |
| 2009/0152917 A1 | 6/2009 | Ostler | |
| 2010/0176632 A1 | 7/2010 | Alford | |
| 2012/0223555 A1* | 9/2012 | Brown, Jr. .......... | A47C 15/004 177/1 |
| 2013/0137524 A1 | 5/2013 | Scott | |
| 2014/0197666 A1 | 7/2014 | Koch | |
| 2017/0202357 A1 | 7/2017 | Holzner | |
| 2018/0041354 A1* | 2/2018 | Nelson .................... | G06F 3/167 |
| 2018/0310086 A1 | 10/2018 | Tracy | |
| 2019/0080554 A1 | 3/2019 | Barbour | |
| 2019/0275919 A1* | 9/2019 | Gayon ..................... | B60N 2/76 |
| 2019/0365170 A1 | 12/2019 | Möwisch | |
| 2020/0139814 A1* | 5/2020 | Galan Garcia ......... | B32B 5/022 |
| 2021/0170871 A1* | 6/2021 | Di Censo ................ | B60K 35/00 |
| 2021/0188140 A1* | 6/2021 | Mizobata ............ | B60R 11/0235 |
| 2021/0235874 A1 | 8/2021 | Rafieha | |

FOREIGN PATENT DOCUMENTS

| | | | | |
|---|---|---|---|---|
| DE | 102014212881 A1 * | 1/2016 | ........... | B60N 2/4613 |
| DE | 102019105229 A1 * | 9/2020 | ............... | A47C 7/54 |
| EP | 2745743 A1 * | 6/2014 | .......... | A47C 31/008 |
| FR | 3086594 A1 * | 4/2020 | .......... | B60N 2/0228 |
| KR | 101873768 B1 * | 7/2018 | | |
| KR | 20200028197 A * | 3/2020 | | |

OTHER PUBLICATIONS

Spring Haven Brown Collection, [online] Retrieved Jul. 11, 2017 from URL: http://www.homedepot.com/collection/patio-furniture/spring-haven-brown-collection.

International Search Report and Written Opinion for App. No. PCT/US21/16162, dated Apr. 14, 2021, 14 pages.

Notice of Allowance dated May 19, 2022 for U.S. Appl. No. 29/722,781 (pp. 1-9).

Notice of Allowance dated May 26, 2022 for U.S. Appl. No. 29/835,944 (pp. 1-8).

* cited by examiner

FIG. 13

CONTROL PANEL FOR FURNITURE AND HOME ENTERTAINMENT SYSTEM

This application claims the benefit of U.S. Provisional Patent Application Ser. No. 62/968,834, filed on Jan. 31, 2020.

BACKGROUND OF THE DISCLOSURE

Field of the Disclosure

The present disclosure relates to a control panel for use in a piece of furniture and/or a home entertainment system.

Description of the Related Art

Furniture has been a part of human life for centuries, and some of the most common pieces of furniture include beds, tables, chairs and sofas. Different innovations have been incorporated into these pieces of furniture over the years to make them more comfortable for the user. These can include different reclining features such as arrangements for chairs (or sofas) that can allow for the backrest to recline while at the same time allowing for the footrest to extend. This arrangement places the user in comfortable and restful position where the back and feet are supported.

Some of these reclining features can be manually operated, with the footrest being spring loaded and released with a lever or handle. At the same time of releasing the footrest, the backrest can be pushed back to the reclined position. Others similar reclining mechanisms can be power operated with the chairs connected to a conventional source of home power. Control buttons are typically included that are arranged at the side of the chair or sofa, a typically comprise on or more push buttons or levers with different buttons controlling different portions of the reclining action. For example, one button can be included to extend the footrest and another can be included to recline the backrest. Other chairs can have more advanced features such as control of the head and neck area to provide greater support, back massage mechanisms, heating mechanisms, etc.

Smart phones and tablets have become common tools in most peoples lives. They are used for many tasks beyond simply making calls or receiving emails or texts. They are gateways to many different platforms and apps, and can perform countless functions for the user.

SUMMARY OF THE DISCLOSURE

The present invention is generally directed to furniture entertainment hubs that are integrated in a piece of furniture to conveniently control the piece of furniture, while at the same time providing a convenient means of communicating with and charging a remote smart device such as a smart phone or tablet. The entertainment hubs can be in many different locations in the piece of furniture, with some embodiments embedded in an armrest with the hub having a touch screen accessible at the top surface of the armrest. The entertainment hub provides a sleek, aesthetic and easy to use mechanism for controlling the chair/sofa and interfacing with remote devices.

One embodiment of an entertainment hub for a seating apparatus comprises a body with a plurality of planar surfaces, wherein one of said plurality of surfaces comprises a substantially flat control panel. The control panel comprises a plurality of visual touch buttons, a remote device wireless charging pad, and a speaker. The body is arranged to be mounted in a piece of furniture with most of the body embedded in said piece of furniture with said control panel being visible and accessible.

One embodiment of a seating apparatus according to the present invention comprising a seat, a backrest connected to a rear side of said seat, and an armrest connected to said seat between the rear side and a front side of the seat. The armrest comprises an entertainment hub with a control panel accessible at the top surface of the armrest, wherein the control panel is at the same height or lower than the top surface of said armrest. The control panel comprises, a substantially flat surface comprising user interfaces such as a plurality of visual touch buttons, a wireless charging pad and a speaker.

One embodiment of a home entertainment system according to the present invention comprises a seat, a backrest connected to a rear side of said seat, a footrest connected to a front side of said seat, and an armrest connected to said seat between said front side and said rear side. The said armrest comprising an entertain hub having a substantially flat control panel at the top surface of said armrest. Said entertainment system further comprising a television and a mobile device, wherein said control panel comprises a plurality of visual touch buttons, a speaker and a wireless charging pad.

These and other further features and advantages of the invention would be apparent to those skilled in the art from the following detailed description, taken together with the accompanying drawings, wherein like numerals designate corresponding parts in the figures, in which:

DETAILED DESCRIPTION OF THE DISCLOSURE

The present invention is directed to power reclining furniture providing an easy-to-use entertainment hub that can be used to control operation of the furniture as well as interfacing with smart devices such as smart phones or tablets. The present invention provides many different features in one device that is conveniently mounted within the armrest of the furniture. The present invention can allow a user to charge a smart device, listen to music from the device, and control reclining positions of the furniture. In some embodiments, smart device charging can be accomplished by wireless charging for devices having these capabilities. For example, recent cell phones comprise wireless changing capabilities and embodiments of the present invention allows for placement of the cell phone on the entertainment hub in the armrest for convenient charging. A Universal Serial Bus (USB) port can be included for charging other devices.

The hub embodiments according to the present invention can also have wireless communication capabilities (such as Bluetooth) that allows for wireless communication with smart devices. The hub can also comprise a built-in speaker, which allows for the hub to play music from a smart device. Other hub embodiments can provide additional capabilities, such as text and phone communications through the smart device, or video play from smart device. Interface with apps, etc.

Different hub embodiments according to the present invention can also be provided with controls for controlling operation of the chair/sofa, such as operation related to reclining. This can include, but is not limited to, controls for backrest, footrest, headrest and lumbar. The hub can also comprise a plurality of memory settings to remember different desired reclining positions. This can allow for multiple users to save their desired reclining position, or for a single user to save multiple reclining positions. Any one of the desired saved positions can be recalled by simply pressing one of the memory icons, and the recliner automatically reclines to the saved position. The hub can include many other features related to reclining, such as a child safety lock and a "home button" to simultaneously return the footrest, headrest and lumbar to their original positions.

Embodiments of the present invention can be electronically implemented using electronic components and software. The embodiments are also operated using a touchscreen that also serves as the resting location for a smart device during charging or operation with the hub. The hub is preferably embedded at the desired location such that only the surface with the touchscreen is visible. In some embodiments, this can be in an armrest of the furniture, with the touchscreen being at or below the top surface of the armrest. In other embodiments, the hub can be embedded in a movable portion of the furniture, such as a movable armrest that can be rotated up and back into the backrest where the hub can be concealed.

The different hub embodiments provide a control panel that allows users to fully use, function and operate their furniture, including but not limited to the operation of its power reclining mechanisms, ability to charge a mobile device, ability to play music through wireless Bluetooth® connection, and the ability to play sound from a television through the furniture. The present disclosure is advantageous over the prior art, for example, in that it allows for ease in operating and controlling the reclining mechanisms, Bluetooth® connection, cup holders, and position locks of the furniture, all through one device and one touchscreen interface.

Throughout this disclosure, the embodiments illustrated should be considered as exemplars, rather than as limitations on the present disclosure. As used herein, the term "invention," "device," "apparatus," "method," "disclosure," "present invention," "present device," "present apparatus," "present method," or "present disclosure" refers to any one of the embodiments of the disclosure described herein, and any equivalents. Furthermore, reference to various features of the "invention," "device," "apparatus," "method," "disclosure," "present invention," "present device," "present apparatus," "present method," or "present disclosure" throughout this document does not mean that all claimed embodiments or methods must include the reference features.

It is also understood that when an element or feature is referred to as being "on" or "adjacent" to another element or feature, it can be directly on or adjacent to the other element or feature or intervening elements or features may also be present. In contrast, when an element is referred to as being "directly on" or extending "directly onto" another element, there are no intervening elements present. Additionally, it is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Furthermore, relative terms such as "inner," "outer," "upper," "top," "above," "lower," "bottom," "beneath," "below," and similar terms, may be used herein to describe a relationship of one element to another. Terms such as "higher," "lower," "wider," "narrower," and similar terms, may be used herein to describe angular relationships. It is understood that these terms are intended to encompass different orientations of the elements or system in addition to the orientation depicted in the figures.

Although the terms first, second, third, etc., may be used herein to describe various elements, components, regions, and/or sections, these elements, components, regions, and/or sections should not be limited by these terms. These terms are only used to distinguish one element, component, region, or section from another. Thus, unless expressly stated otherwise, a first element, component, region, or section discussed below could be termed a second element, component, region, or section without departing from the teachings of the present disclosure. As used herein, the term "and/or" includes any and all combinations of one or more of the associated list items.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. For example, when the present specification refers to "an" assembly, it is understood that this language encompasses a single assembly or a plurality or array of assemblies. It is further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Embodiments as described in the present disclosure can be described herein with reference to view illustrations, some of which are schematic in nature. As such, the actual thickness of elements can be different, and variations from the shapes of some of the illustrations as a result, for example, of manufacturing techniques and/or tolerances are expected. Thus, the elements illustrated in some of the figures are schematic in nature and their shapes are not intended to illustrate the precise shape of a region and are not intended to limit the scope of the disclosure.

Figure 1:
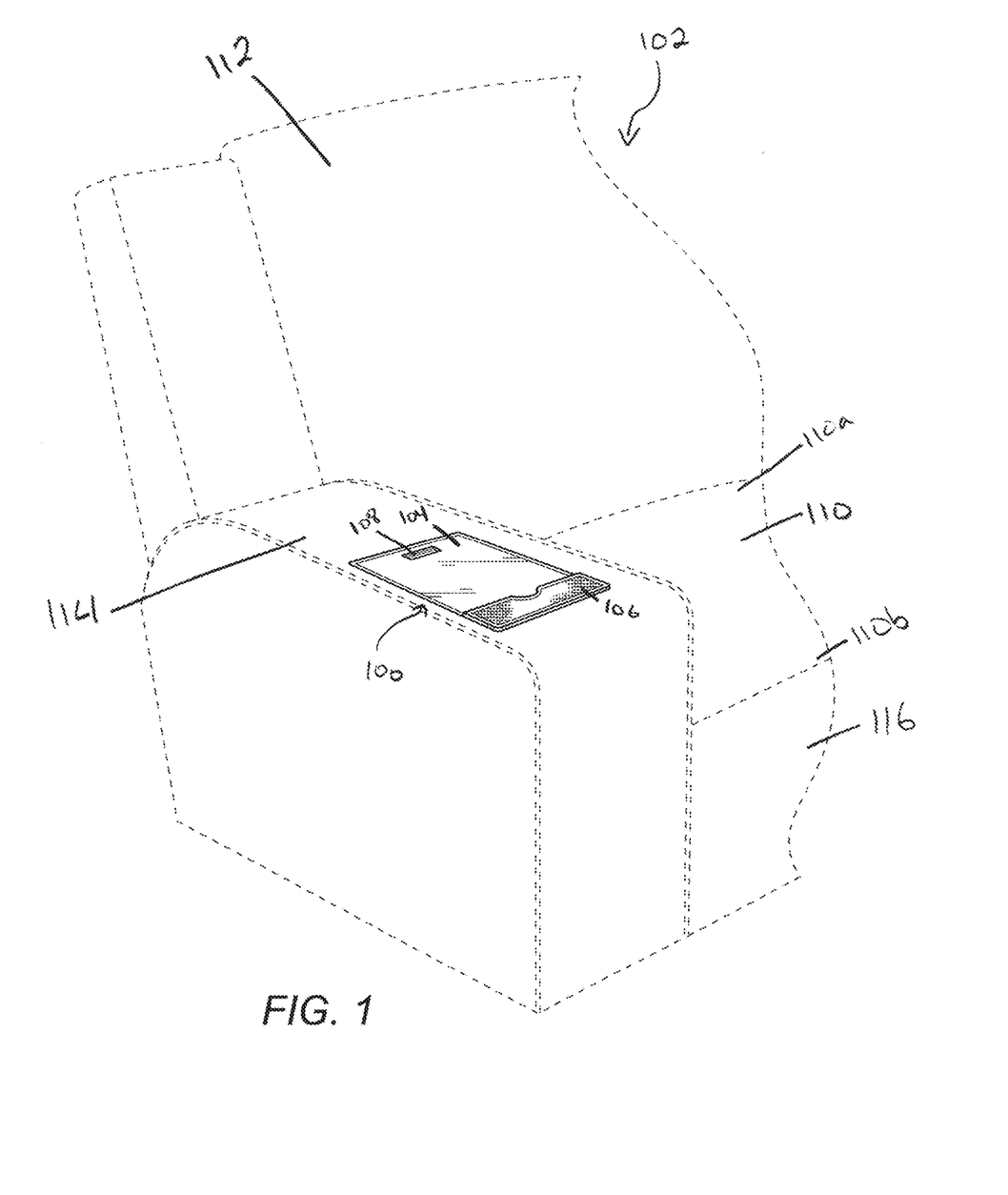
FIG. 1 is a perspective view of a piece of furniture according to an embodiment of the present disclosure.
Figure 2:
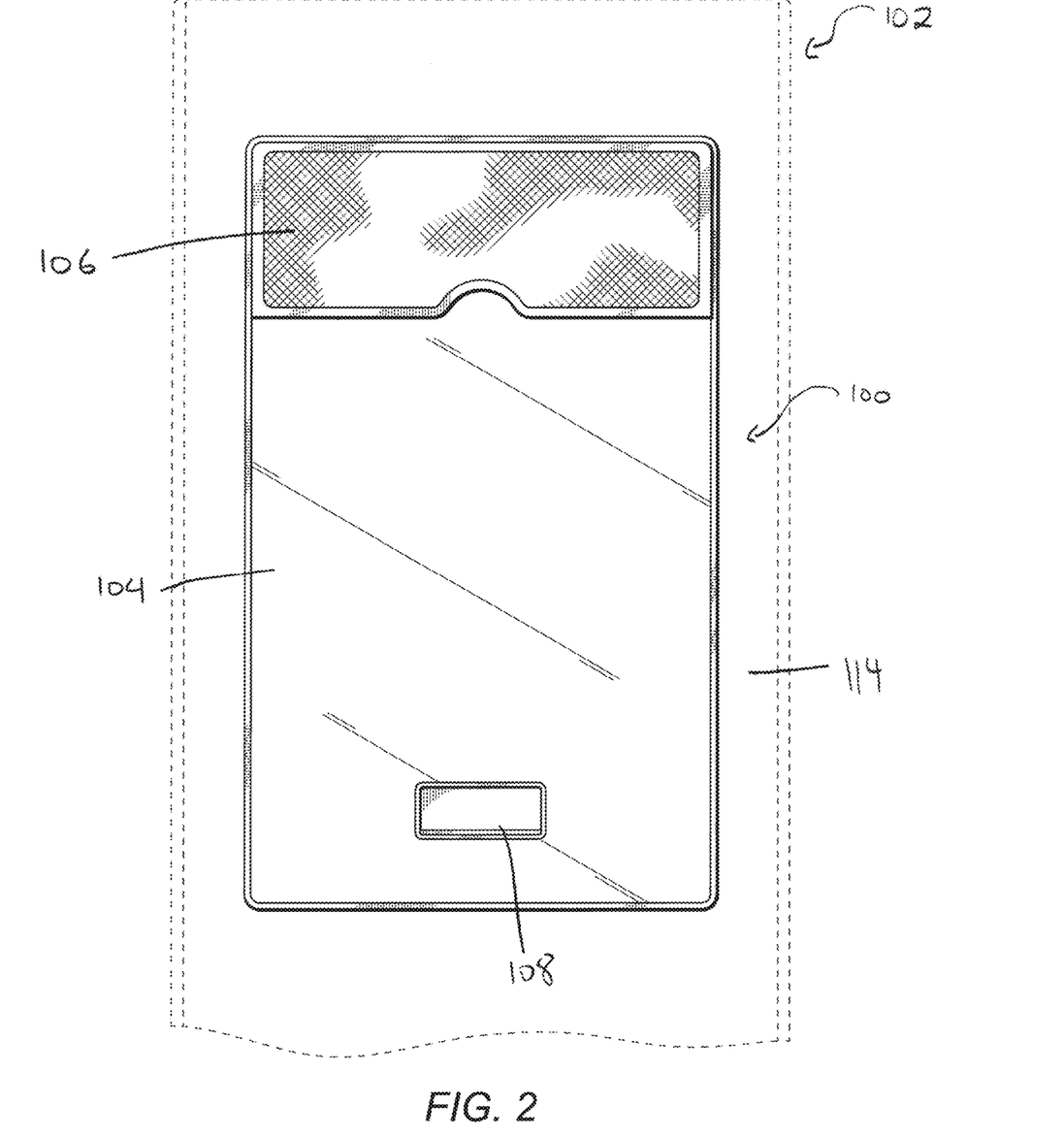
FIG. 2 is a top perspective view of a furniture armrest according to an embodiment of the present disclosure.

FIGS. 1 and 2 show a perspective and top view, respectively, of a piece of furniture according to an embodiment of the present disclosure. As shown, the piece of furniture is a seating apparatus 102, which comprises a seat 110, a backrest 112 connected to a rear side 110a of seat 110, a footrest 116 connected to a front side 110b of seat 110, and an armrest 114 connected on the side of seat 110 between the rear side 110a and front side 110b of seat 110. FIGS. 1 and 2 also show armrest 114 comprising an entertainment hub according to the present invention comprising a touch screen control panel 100 with a substantially flat top surface 104, a speaker 106, and a hardwire port 108 (e.g. USB port) with a socket for charging a remote device (not shown). Port 108 may also comprise other sockets such as a socket configured to accept a headphone jack. As shown, control panel 100 is built into seating apparatus 102 such that most of it is concealed with in the arm rest 114 and with substantially flat surface 104 is flush with (or just below) the top surface of the armrest 114.

Figure 3:
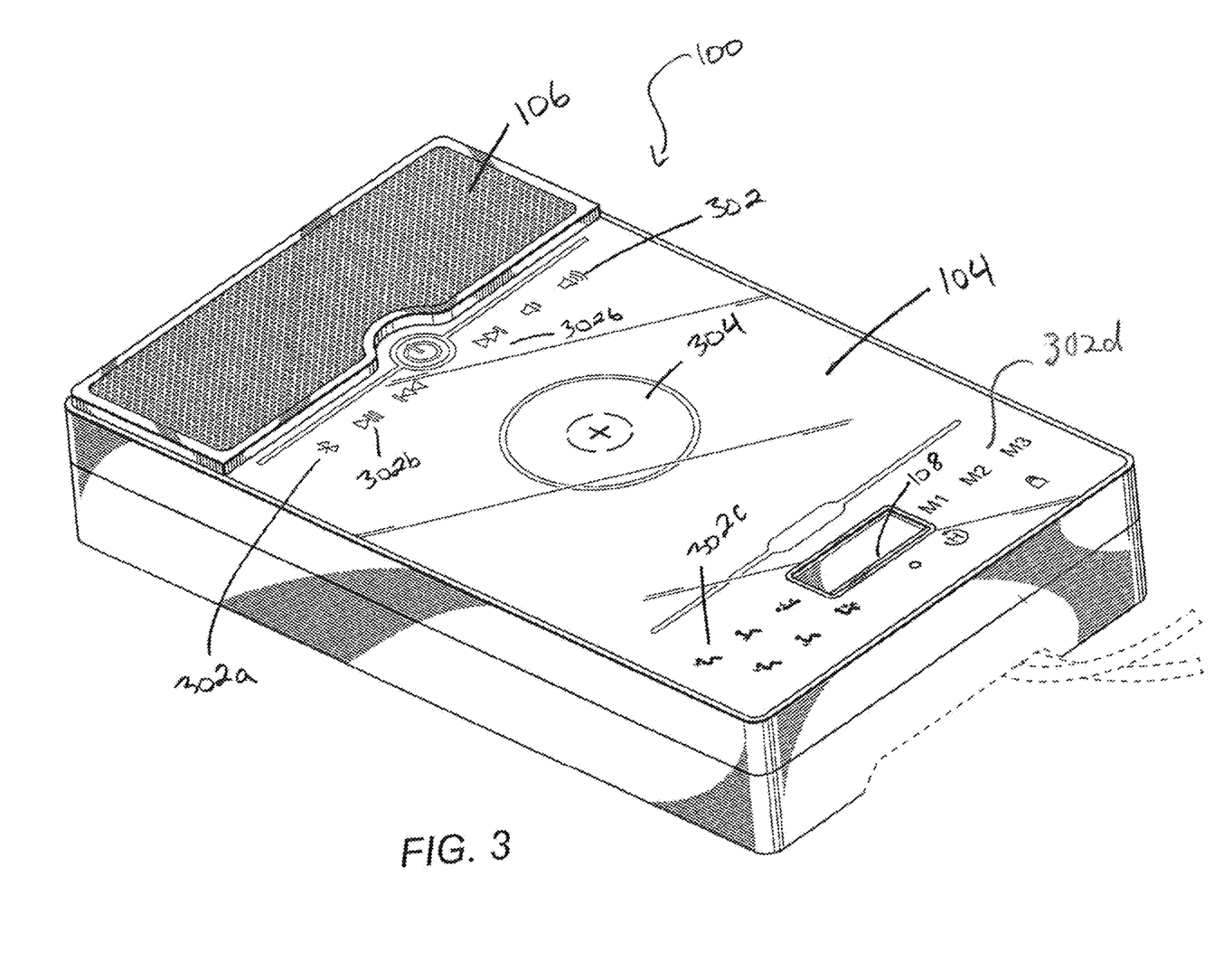
FIG. 3 is a perspective view of an entertainment hub and furniture controller according to an embodiment of the present disclosure.
Figure 4:
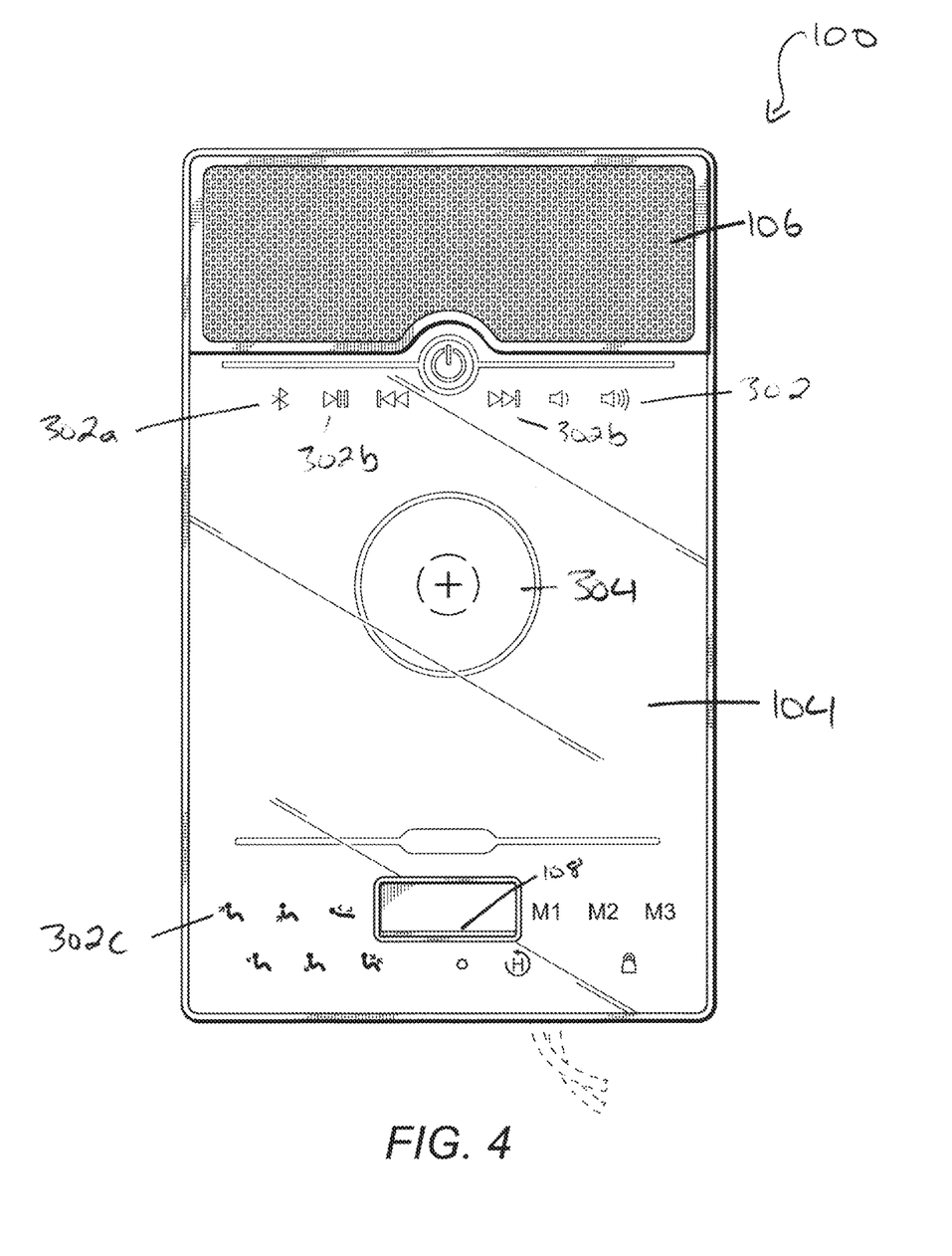
FIG. 4 is a top view of an entertainment hub and furniture controller according to an embodiment of the present disclosure.

FIGS. 3 and 4 show a perspective and top view, respectively, of control panel 100 according to an embodiment of the present disclosure. As shown, the substantially flat surface 114 of control panel 100 comprises a plurality of visual touch buttons 302 and a wireless charging pad 304 for charging a remote device. One of the visual touch buttons 302a may be configured to create a wireless connection between control panel 100 and a remote device to allow the remote device to wirelessly transmit an audio signal to speaker 106, for example, by means of Bluetooth® technology. The touch button can be configured to illuminate when a wireless connection is successfully established. This can allow the hub according to the present invention to communicate with a smart device to allow the hub to play music through the speaker 106 from the smart device.

One or more other visual touch buttons 302b may be configured to transmit a command wirelessly to the remote device, such as play, pause, skip, back, volume increase, and/or volume decrease. Still other visual touch buttons 302c may be configured to electronically adjust seating apparatus 102, for example, by adjusting backrest 112 or footrest 116. In other embodiments touch buttons can be included to control the lumbar or headrest.

The control panel can also comprise a plurality of memory touch buttons 302d, with the embodiment shown having three touch buttons 302d. This allows for the user to save three different desirable reclining positions. Once the desired position is saved, the chair/sofa will recline to the one of the three saved recliner locations by pressing the particular one of the memory touch buttons 302d.

It is understood that different embodiment of the present invention can use different types of touch screens, including but not limited to, resistive touch screen, surface capacitive touch screen, projected capacitive touch screen, surface acoustic wave touch screen, and infrared touch screen. It is also understood that different wireless communication systems can be used beyond Bluetooth®, and many different wireless charging systems can be used, including but not limited to, inductive charging systems such as the system commercially known as Qi Wireless.

Figure 5:
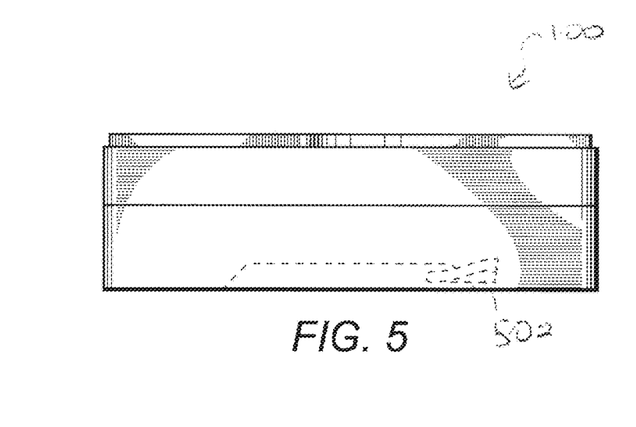
FIG. 5 is a bottom side view of an entertainment hub and furniture controller according to an embodiment of the present disclosure.
Figure 6:
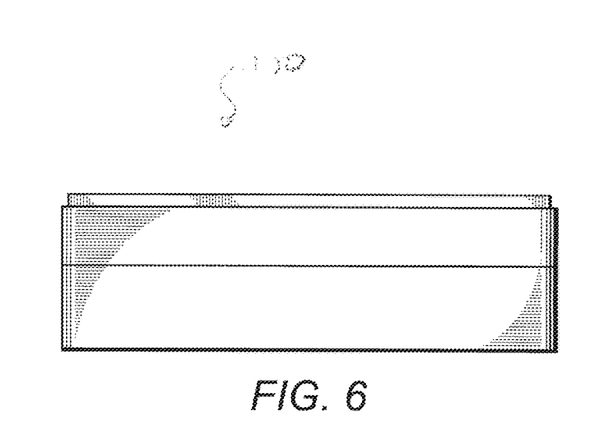
FIG. 6 is a top side view of an entertainment hub and furniture controller according to an embodiment of the present disclosure.
Figure 7:
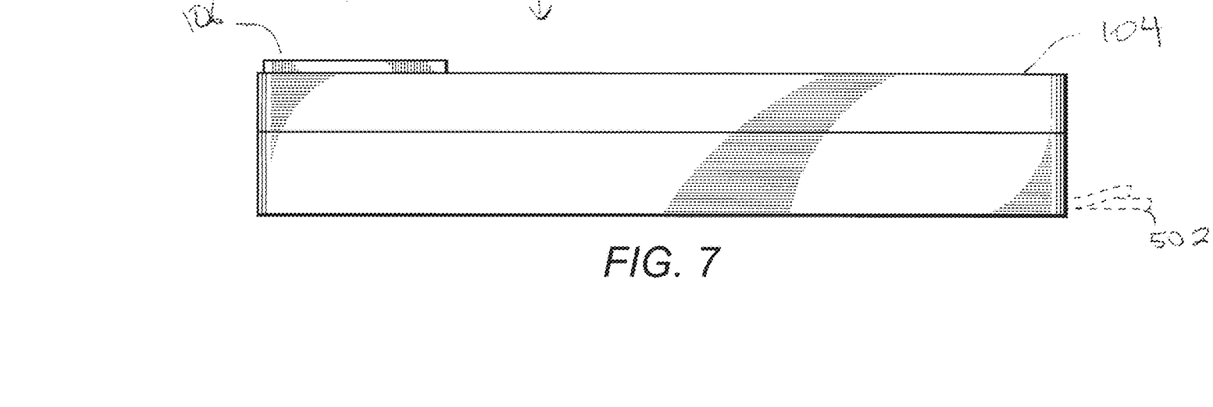
FIG. 7 is a left side view of an entertainment hub and furniture controller according to an embodiment of the present disclosure, the right side view being substantially the same.

FIGS. 5-7 show a bottom, top, and left side view, respectively, of control panel 100 according to an embodiment of the present disclosure. As shown in FIGS. 5 and 7, control panel 100 may comprise a wired connection 502 to be routed through seating apparatus 102. FIG. 7 also shows that speaker 106 may, in some embodiments, be raised higher than the substantially flat surface 104 of control panel 100. In still other embodiments, the speaker can be at the same level as the substantially flat surface 104.

In certain embodiments, control panel 100 may be incorporated into a home entertainment system further comprising seating apparatus 102 and one or more remote devices (not shown), such as a television and/or a mobile device (e.g., mobile phone, electronic tablet, personal computer). Control panel 100 may form a wireless or hardwire connection with the one or more remote devices such that control panel 100 can control the remote devices and play an audio signal transmitted by the remote devices through speaker 106. In certain embodiments, the home entertainment system may contain multiple control panels 100 and/or multiple speakers 106 that may also be built into pieces of furniture such as seating apparatus 102.

Figure 8:
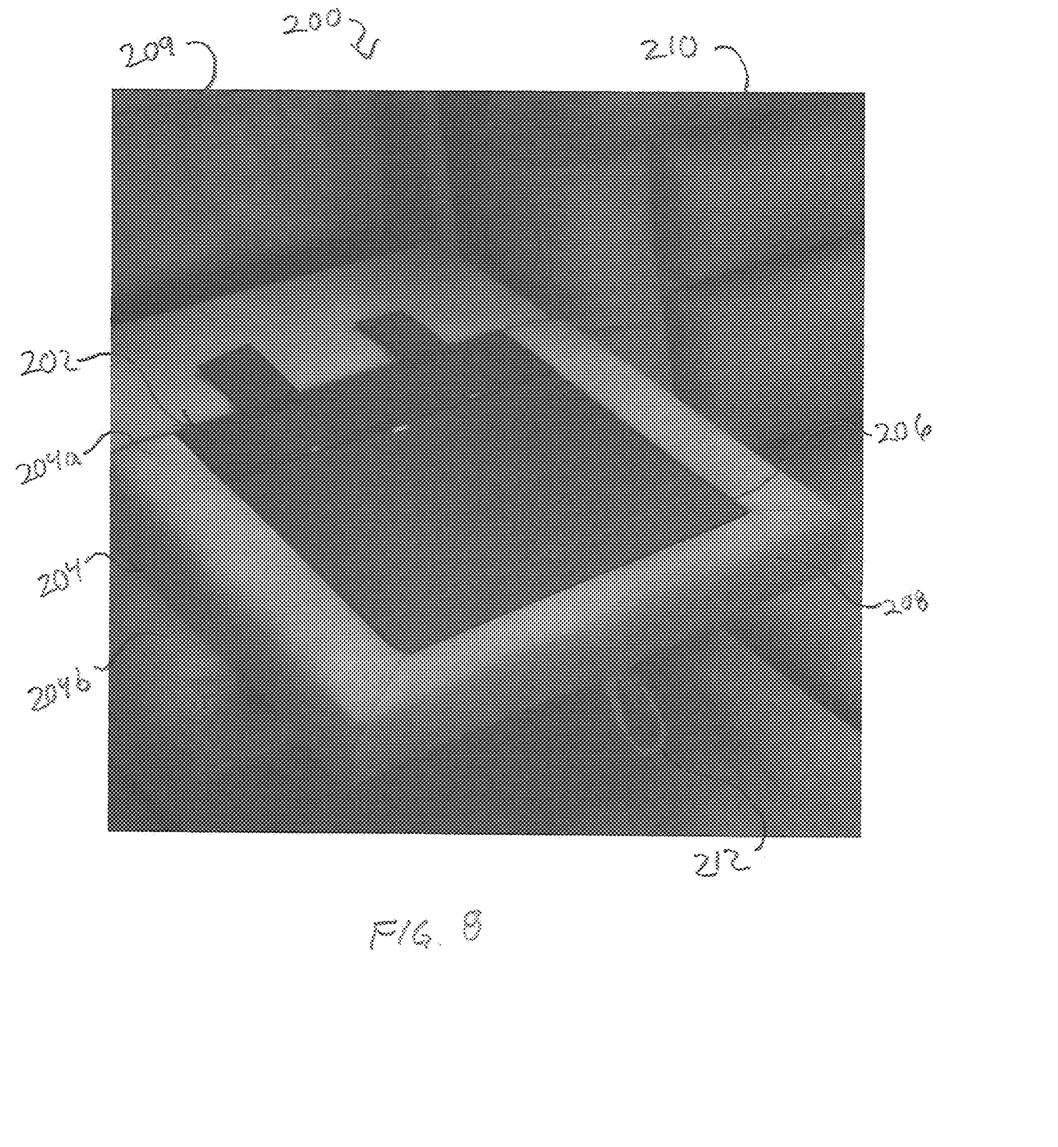
FIG. 8 is a perspective view of another piece of furniture according to an embodiment of the present disclosure.

FIGS. 8-12 show another embodiment of a piece of furniture 200 according to the present invention, having an entertainment hub 202 also according to the present invention. Referring first to FIG. 8, the piece of furniture 200 can comprise a sofa, and the hub 202 is arranged in a sofa armrest 204 that is between two of the sofa's seating locations. As such, the hub 202 is arranged to provide control for two users, with each of the users on opposing sides of the hub 202. Armrest 204 is a split armrest comprising an upper armrest 204a and a lower armrest 204b. The lower armrest 204b is positioned on the seating surface of the sofa, between the two seating positions. It primarily comprises a cushion for the users to rest their arms. The upper armrest 204a houses the hub 202 and is shown in its down position, resting on the lower armrest 204b with the control panel 206 substantially horizontal and accessible by the user. The cushioning 208 around the control panel also provides a comfortable surface for the users to rest their arms.

When the hub 202 is not in use, the upper armrest 204a can be rotated up and moved into the upper armrest cavity 209 in the back of the sofa backrest 210. This conceals the hub 202 in the backrest 210 when the hub 202 is not in use. Accordingly, the sofa 200 can be used with the upper armrest 204a down and the control panel 206 accessible for use, or with the upper armrest 204a in the backrest cavity 209 with the panel concealed. In some embodiments, the hub 202 can be arranged so that it automatically turns off when the upper armrest 204a is in the cavity 209.

The upper armrest 204a can have features to assist in moving it into the cavity 209, such as loop 212 that is positioned so that a user can grasp the loop to conveniently rotate the upper armrest 204a to the cavity 209. Other features can be used that can be in other locations, and in other embodiments a control button can be provided that would allow for the armrest with mechanisms for power rotation of the upper armrest to cavity 209. In some embodiments, this comprise a close touch button (not shown) on the control panel 206.

Figure 9:
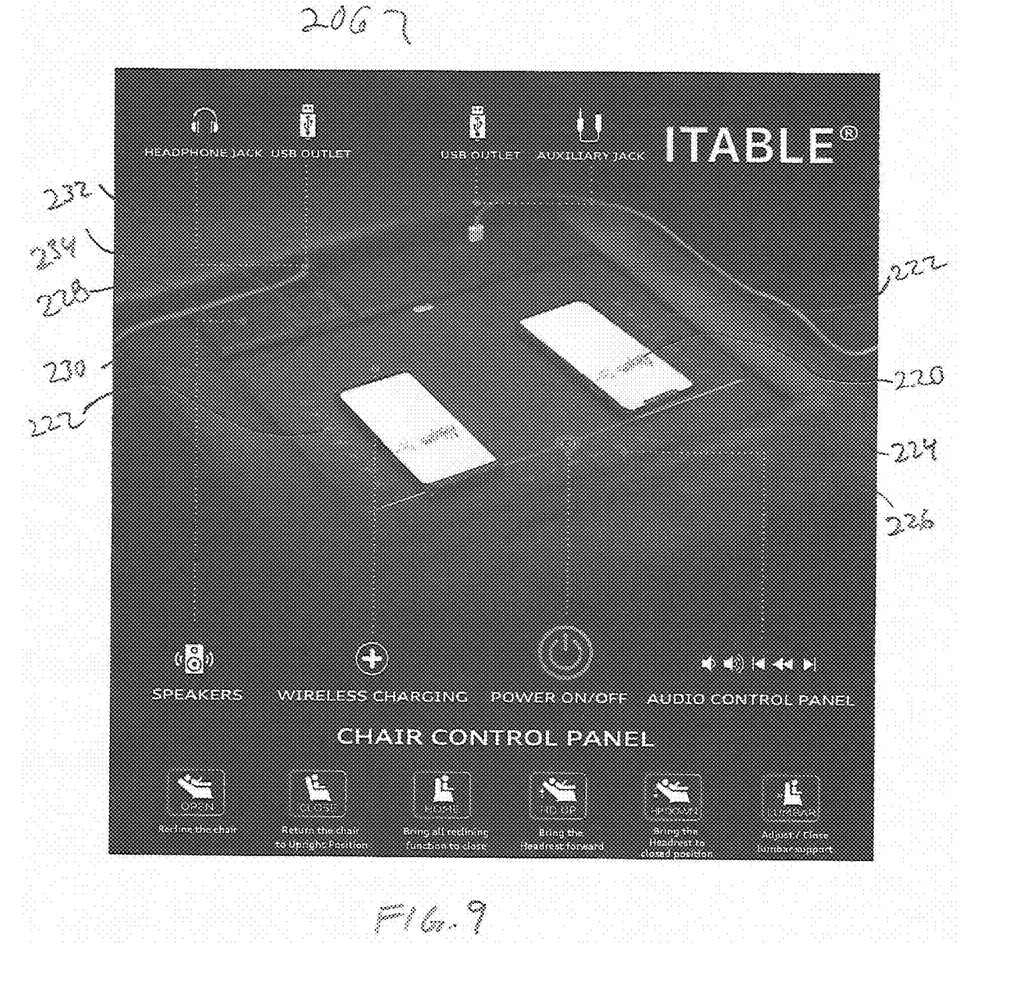
FIG. 9 is perspective view of a furniture armrest having an entertainment hub and furniture controller according to the present invention.
Figure 10:
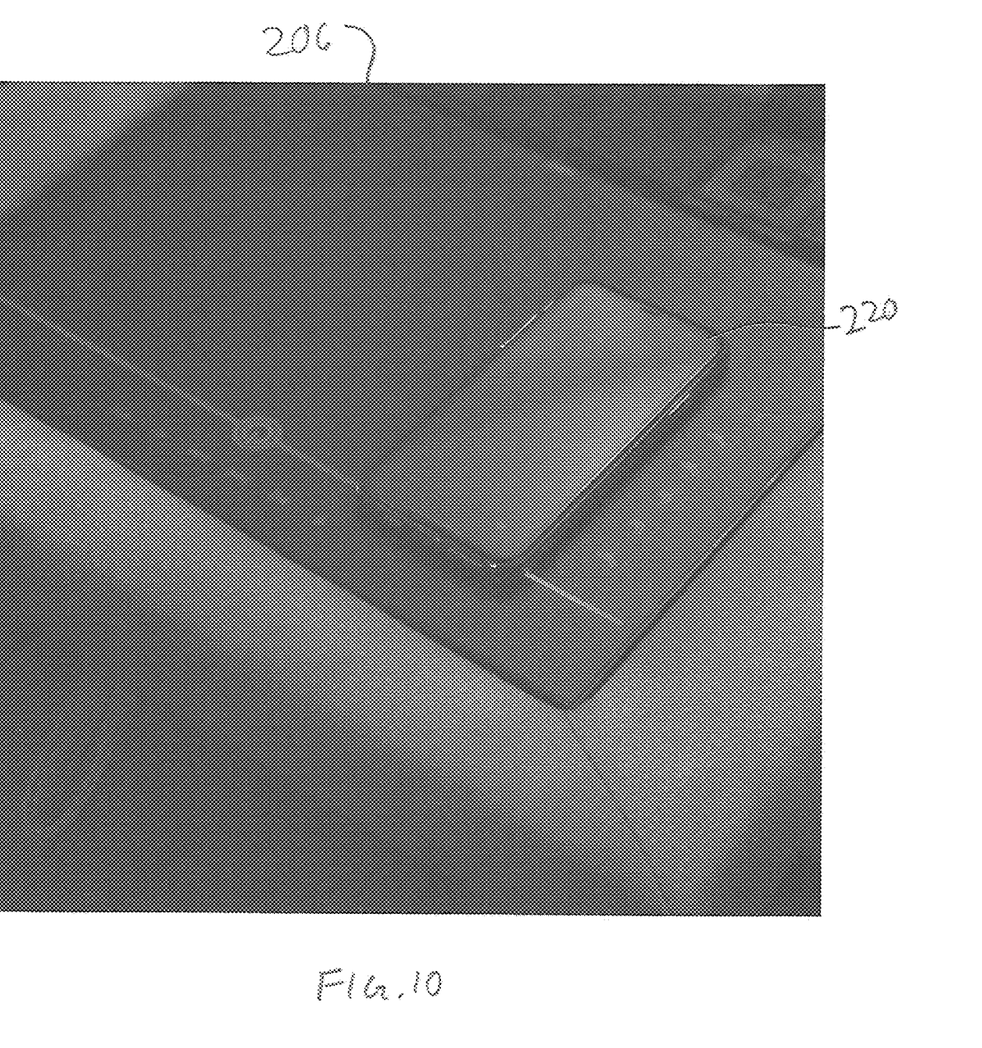
FIG. 10 is another perspective view of a furniture armrest having an entertainment hub and furniture controller according to the present invention.

FIGS. 9-12 show the touch panel 206 in more details with some of its features and touch screen buttons. Referring now to FIGS. 9 and 10, the panel comprises two locations for wirelessly charging a smart device, such as smart phone 220. Different wireless charging technologies can be used as mentioned above. The phone 220 need only be rested on the panel 206 in the designated location and the phone will charge.

Figure 11:
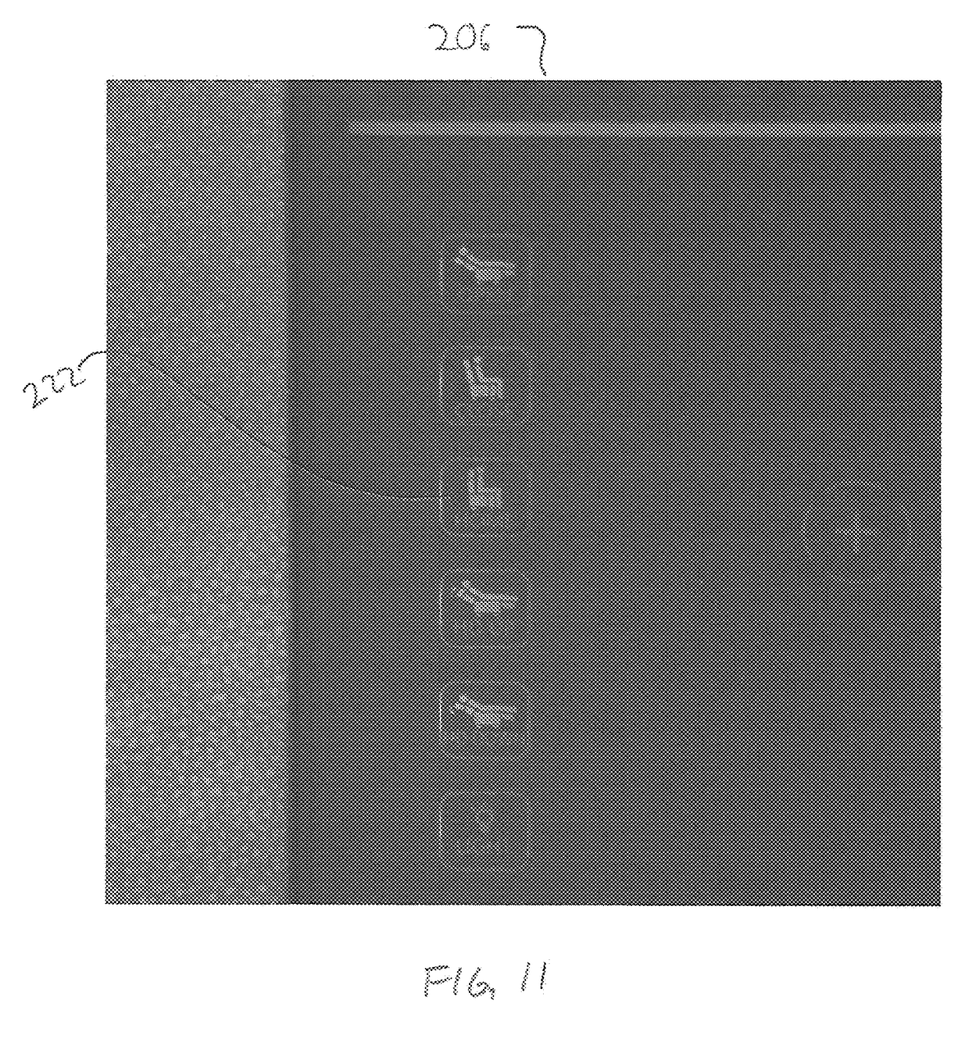
FIG. 11 is a top view of a portion of a control panel for an entertainment hub and furniture controller according to the present invention.

Referring now to FIGS. 9 and 11, each side of the panel 206 that is adjacent to each of the seating locations has reclining controls 222 for adjusting the reclining of the sofa's seating locations. In the embodiment shown, there are open and close control for recline and up and down controls for the headrest. There is also a home button that, upon a single touch screen press, brings the seating to its original (without recline) position. The panel 206 also has a light touch screen control to turn on and off a light connected to the hub.

Figure 12:
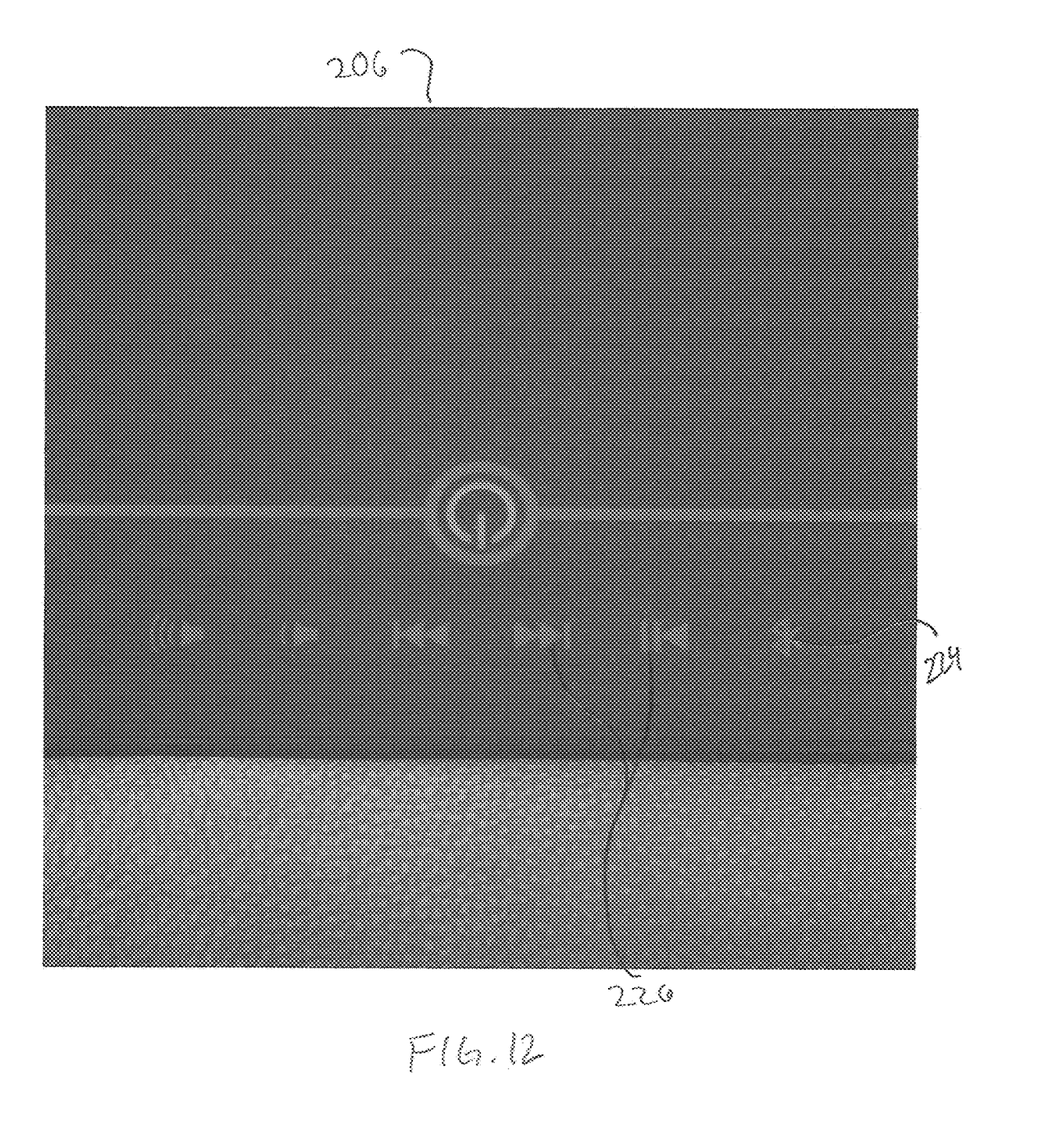
FIG. 12 is another top view of a portion of a control panel for an entertainment hub and furniture controller according to the present invention.

Referring now to FIGS. 9 and 12, the panel 206 also has touch button 224 for Bluetooth® connection to a smart device and audio control touch buttons 226 for controlling the playing of music on the hub once a Bluetooth® connection is made to the smart device. Adjacent the audio controls 226 is an On/Off control button for turning power on and off to the hub. In some embodiments, the panel can be arranged to communicate with only one smart device at a time, while in other embodiments it can be arranged to communicate with more than one device.

Figure 13:
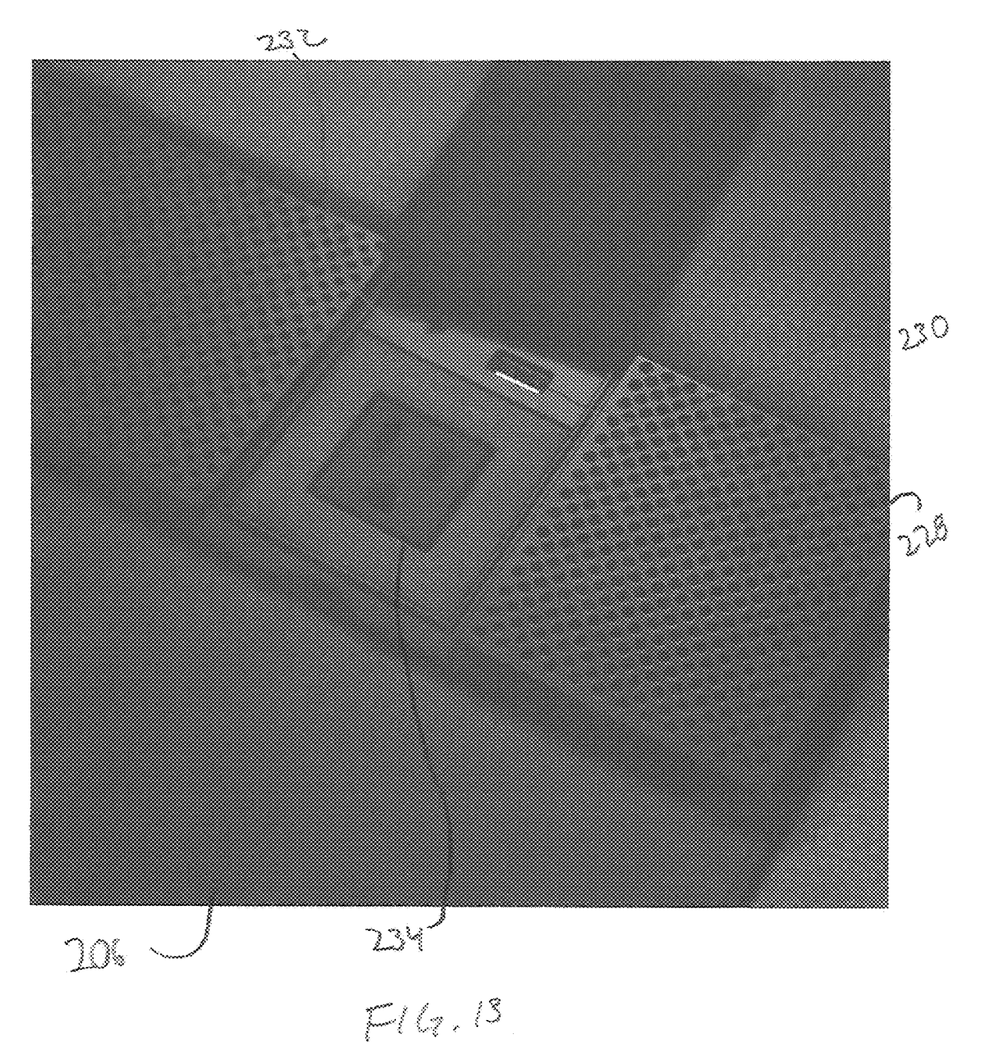
FIG. 13 is still another top view of a portion of a control panel for an entertainment hub and furniture controller according to the present invention.

Referring now to FIGS. 9 and 13, the panel 206 can also have one or more audio speakers 228 that can be arranged to play music from the smart device paired to the hub by Bluetooth®, or can play audio from a television being viewed from the sofa. Different speakers can be used, with some embodiments having high definition (HD) 3 speakers. For each occupant of sofa, the panel also comprises a USB port 230, an auxiliary port 232, and a three-prong outlet 234.

It is understood that embodiments presented herein are meant to be exemplary. Embodiments of the present disclosure can comprise any combination or compatible features shown in the various figures, and these embodiments should not be limited to those expressly illustrated and discussed.

Although the present disclosure has been described in detail with reference to certain configurations thereof, other versions are possible. Further, none of the elements or features discussed herein should be construed as necessary, critical, or essential for any particular embodiment of the present disclosure. Therefore, the spirit and scope of the disclosure should not be limited to the versions described above. The foregoing is intended to cover all modifications and alternative constructions falling within the spirit and scope of the disclosure as expressed in the appended claims, wherein no portion of the disclosure is intended, expressly or implicitly, to be dedicated to the public domain if not set forth in the claims.

I claim:

1. A seating apparatus, comprising:
   a seat;
   a backrest connected to a rear side of said seat; and
   an armrest connected to said seat between said rear side and a front side of said seat, said armrest comprising an entertainment hub with a control panel accessible at the top surface of said armrest, wherein said control panel is at the same height or lower than the surface of said armrest, wherein said control panel comprises the following all of which are accessible at said substantially flat control panel:
   a substantially flat surface comprising a plurality of visual touch buttons;
   a wireless charging pad; and
   a speaker;
   wherein at least one of said visual touch buttons is operable to create a wireless connection between said apparatus and a remote device and wherein said armrest is rotatable from between said rear side and a front side of said seat to a position wherein said control panel is concealed.

2. The seating apparatus of claim 1, further comprising at least one hardwire charging port.

3. The seating apparatus of claim 1, wherein one of said visual touch buttons is configured to create a wireless connection between said control panel and a remote device to allow said remote device to transmit an audio signal to said speaker.

4. The seating apparatus of claim 3, wherein at least one of said visual touch buttons is configured to wirelessly transmit a command to said remote device.

5. The seating apparatus of claim 4, wherein at least one of said visual touch buttons is configured to electronically adjust said seating apparatus.

6. The seating apparatus of claim 3, wherein said remote device comprises a smart phone.

7. The seating apparatus of claim 1, further comprising at least one hardwire port comprising a socket configured to charge a remote device.

8. The seating apparatus of claim 1, wherein said wireless charging pad is configured to wirelessly connect to a remote device to allow said remote device to transmit an audio signal to said speaker.

9. The seating apparatus of claim 8, wherein at least one of said visual touch buttons transmits a command to said remote device.

10. The seating apparatus of claim 1, wherein at least one of said visual touch buttons is configured to electronically adjust said backrest.

11. The seating apparatus of claim 1 wherein said seating apparatus further comprises a headrest or a footrest.

12. The seating apparatus of claim 11, wherein at least one of said visual touch buttons is configured to electronically adjust said headrest or footrest.

13. The seating apparatus of claim 1, wherein said entertainment hub comprises a body having a plurality of planar surfaces, wherein one of said surfaces comprises said control panel, wherein most of said body is embedded in said armrest.

14. The seating apparatus of claim 1, wherein said armrest is rotatable from between said rear side and a front side of said seat to a position wherein it is within an armrest cavity in said backrest.

15. A seating apparatus, comprising:
   a seat;
   a backrest connected to a rear side of said seat; and
   an armrest connected to said seat between said rear side and a front side of said seat, said armrest comprising an entertainment hub with a control panel accessible at the top surface of said armrest, wherein said control panel is at the same height or lower than the surface of said armrest, wherein said control panel comprises the following all of which are accessible at said substantially flat control panel:
   a substantially flat surface comprising a plurality of visual touch buttons;
   a wireless charging pad; and
   a speaker;

wherein at least one of said visual touch buttons is operable to create a wireless connection between said apparatus and a remote device;

wherein said entertainment hub comprises a body having a plurality of planar surfaces, wherein one of said surfaces comprises said control panel, wherein most of said body is embedded in said armrest and wherein said armrest comprises a split armrest having an upper and lower armrest, wherein said body is embedded in said upper armrest.

16. The seating apparatus of claim 15, wherein said upper armrest is rotatable to wherein it is within and armrest cavity and said control panel is concealed.

17. A home entertainment system, comprising: a seating apparatus, comprising:
a seat;
a backrest connected to a rear side of said seat;
a footrest connected to a front side of said seat; and
an armrest connected to said seat between said front side and said rear side, said armrest comprising an entertainment hub having a substantially flat control panel at the top surface of said armrest,
a television; and
a mobile device;
wherein said control panel comprises:
a plurality of visual touch buttons;
a speaker; and
a wireless charging pad;
wherein at least one of said visual touch buttons operable to create a wireless connection between said apparatus and said mobile device and
wherein said control panel is configured to wirelessly connect to said television to allow said television to transmit an audio signal to said speaker.

18. The home entertainment system of claim 17, wherein said control panel is configured to wirelessly connect to said mobile device to allow said mobile device to transmit an audio signal to said speaker.

19. The home entertainment system of claim 18, wherein at least one of said visual touch buttons is configured to transmit a command to said mobile device.

20. The home entertainment system of claim 17, wherein at least one of said visual touch buttons is configured to electronically adjust said backrest.

* * * * *